Sept. 24, 1940.  A. KUHNS  2,215,646
POWER ASSEMBLY
Filed March 24, 1939
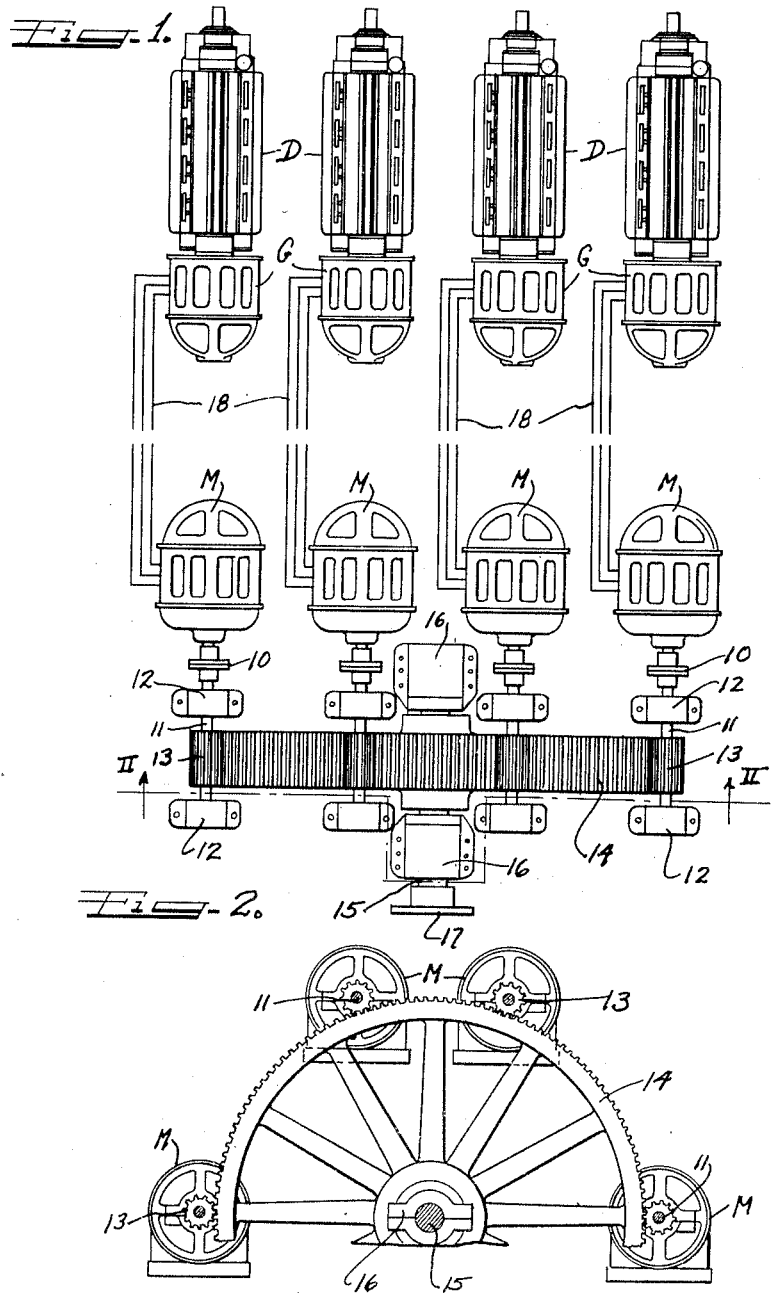
Inventor
AUSTIN KUHNS.
by Charles W. Hills
Atty.

Patented Sept. 24, 1940

2,215,646

UNITED STATES PATENT OFFICE 2,215,646

POWER ASSEMBLY

Austin Kuhns, Buffalo, N. Y., assignor to Farrel-Birmingham Company, Incorporated, Buffalo, N. Y., a corporation of Connecticut Application March 24, 1939, Serial No. 263,940

3 Claims. (Cl. 290—4)

This invention relates to power assemblies, the object being to provide a more efficient power or propulsion system in which a number of alternating current synchronous motors combine their driving torque or power output and each motor is individually supplied with current from a power generator unit, such as a Diesel-generator unit, in which the generator is directly driven by a Diesel engine.

In systems of the type referred to, it is very important, in order that maximum efficiency be obtained, that the Diesel-generator units operate synchronously in order that the motors may all operate at the same speed for equal torque or driving effort on structures to be driven.

An important object of the invention is to effect synchronous operation of the Diesel-generator units by mechanical control of the motors. This may be accomplished by gearing the motors to a bull gear, to which a structure to be operated or propelled is coupled. The motors will thus be compelled to run at all times at the same speed, and therefore any departure from synchronous operation of the Diesel-generator units will result in change in electrical conditions tending to restore the Diesel-generator units to synchronous operation.

On the accompanying drawing,

Figure 1 shows more or less diagrammatically a power assembly incorporating the features of my invention; and Figure 2 is a sectional view on the plane II—II of Figure 1.

The assembly shown comprises four alternating current synchronous motors M, although any number of motors may be employed. These motors are preferably of like capacity and the shaft of each motor is directly connected as by a coupling 10 with a driving shaft 11 journalled at bearings 12. Each driving shaft supports a driving pinion 13, and all of the driving pinions mesh with a bull gear 14 mounted on a shaft 15 which is journalled in bearing structures 16 and adapted at one end to be connected, as by a coupling 17, with the structure to be driven.

Each motor is supplied with current through conductors 18 extending from an alternating current synchronous generator G directly connected by a power source, such as a Diesel engine D, the generators being of the three-phase type.

With the rotors of the motors all geared to the bull gear 14, these rotors will always rotate at the same relative speed, whatever the speed may be, and for efficient operation, the Diesel-generator units should operate in synchronism in order to maintain the electrical characteristics of the motors for equal torque exertion of the motors on the bull gear. The Diesel engines may be provided with well-known speed governing devices tending to maintain equal speed of the engines, but abnormal conditions may arise tending to disturb synchronous operation.

Suppose that one of the Diesel engines should lag and reduce the speed of its generator. The motor supplied by the generator will then lag and correspondingly reduce its torque effort on the bull gear, but the bull gear driven by the other motors will then drive the electrically lagging motor as a generator and the generator of the power unit will function as a motor to restore the speed of the corresponding engine back into synchronization with the other engines so that the Diesel-generator units will again be in synchronism and the motors will apply equal torque effort on the bull gear.

If one of the engines increases speed over that of the other engines, the corresponding motor will tend to correspondingly increase its speed of rotation over that of the other motors, but it cannot do so on account of the bull gear, and the result will be increased torque effort of the motor on the bull gear to increase the speed thereof, and then the other motors will be momentarily driven faster than the corresponding generators and these generators will function as motors to increase the speeds of their engines until the engines of the units are again in synchronism for equal torque production of the motors. Thus, the mechanical control of the motors by the bull gear will result in electrical control of the generators to restore and maintain synchronous operation of the units.

I have shown a practical and efficient embodiment of my invention, but I do not desire to be limited to the exact arrangement shown and described, as changes may be made without departing from the scope and spirit of the invention.

I claim as follows:

1. In a power assembly, two or more alternating current synchronous motors, an individual power unit for each motor comprising a Diesel engine and an alternating current synchronous generator directly driven thereby and connected with the motor to supply current thereto, and means for synchronizing the operation of the power units comprising a bull gear meshed by the driving pinions of the motors for equalizing speeds of said motors at all times, said bull gear being adapted for connection with a load to be driven.

2. In a power assembly, a number of alternating current synchronous motors, an individual driving unit for each motor comprising a power source and an alternating current synchronous generator connected with the motor to supply current thereto, and means for connecting said motors with a load to be driven comprising gearing arranged to cause mechanical operation of said motors at equal speeds.

3. In a power system, a plurality of independent power assemblies each comprising a power unit in the form of an alternating current synchronous generator directly driven by a Diesel engine and a synchronous motor supplied with current by the generator, said power units being relatively of like capacity and said motors being relatively of like capacity, and a common gear connected with a load to be driven and meshed by the driving pinions of the rotors of said motors for maintaining mechanical synchronization of said motors, the arrangement being such that the electrical reactions between said motors and generators will maintain mechanical synchronization of said power units.

AUSTIN KUHNS.